US012125327B1

(12) United States Patent
Minsley et al.

(10) Patent No.: US 12,125,327 B1
(45) Date of Patent: Oct. 22, 2024

(54) DEVICE, SYSTEM AND METHOD FOR TRANSMITTING UNLOCK CODES VIA DISPLAY AUGMENTATION

(71) Applicant: DAVINCI LOCK LLC, Raleigh, NC (US)

(72) Inventors: Bradford A. Minsley, Raleigh, NC (US); Clifton P. Minsley, Raleigh, NC (US)

(73) Assignee: DaVinci Lock LLC, Raleigh, NC (US)

( * ) Notice: Subject to any disclaimer, the term of this patent is extended or adjusted under 35 U.S.C. 154(b) by 0 days.

(21) Appl. No.: 18/512,311

(22) Filed: Nov. 17, 2023

(51) Int. Cl.
*G07C 9/00* (2020.01)

(52) U.S. Cl.
CPC .................... *G07C 9/00309* (2013.01); *G07C 2009/00404* (2013.01)

(58) Field of Classification Search
None
See application file for complete search history.

(56) References Cited

U.S. PATENT DOCUMENTS 4,870,400 A 9/1989 Downs et al.
5,964,110 A 10/1999 Crocco et al.
7,047,773 B1 5/2006 Lin
7,236,085 B1 6/2007 Aronson et al.
8,108,927 B2 1/2012 Michelle et al.
8,774,714 B2 7/2014 Metivier
9,373,201 B2 * 6/2016 Jefferies ................ B60R 25/045
9,464,460 B2 10/2016 Lai
9,524,600 B2 12/2016 Yong et al.
9,908,697 B2 3/2018 De Roquette Buisson et al.
10,089,811 B2 10/2018 Ufkes
10,124,765 B2 11/2018 Wilt et al.
10,614,646 B1 4/2020 Douglass et al.
10,733,681 B2 8/2020 Boss et al.
2002/0059114 A1 5/2002 Cockrill et al.
2003/0061192 A1 3/2003 McGunn et al.
2004/0030934 A1 4/2004 Mizogushi et al.
2005/0154605 A1 7/2005 Tropp
2005/0237149 A1 10/2005 Loftin et al.
2005/0241003 A1 10/2005 Sweeney et al.
2007/0214369 A1 9/2007 Roberts et al.

(Continued)

FOREIGN PATENT DOCUMENTS

CN 111599048 8/2020
EP 2799646 11/2014
WO 2012047850 4/2014

OTHER PUBLICATIONS

Hung et al., "A Door Lock System with Augmented Reality Technology", 2017 IEE 6th Global Conference on Consumer Electronics (GCCE 2017).

(Continued)

*Primary Examiner* — Carlos Garcia
(74) *Attorney, Agent, or Firm* — Williams Mullen; Thomas F. Bergert

(57) ABSTRACT

Embodiments of the present disclosure provide a device and method for displaying an unlock code for a lock upon lock related indicia being detected by a mobile communications device. The lock related indicia can be captured via a camera of the mobile communications device. In various embodiments, the unlock code can be revealed via an augmented reality display of the mobile communications device.

20 Claims, 5 Drawing Sheets

(56) References Cited

U.S. PATENT DOCUMENTS

| | | | | |
|---|---|---|---|---|
| 2008/0246583 | A1 | 10/2008 | Blake et al. | |
| 2009/0083851 | A1 | 3/2009 | Michelle | |
| 2009/0256676 | A1 | 10/2009 | Piccirillo et al. | |
| 2009/0328203 | A1 | 12/2009 | Hass | |
| 2012/0169461 | A1 | 7/2012 | Dubois | |
| 2013/0024528 | A1 | 1/2013 | Gallant et al. | |
| 2013/0139408 | A1 | 6/2013 | Chaiken | |
| 2013/0335193 | A1 | 12/2013 | Hanson et al. | |
| 2014/0207499 | A1 | 7/2014 | Fleiss et al. | |
| 2014/0207657 | A1 | 7/2014 | Gacs | |
| 2014/0266585 | A1 | 9/2014 | Chao et al. | |
| 2014/0309842 | A1* | 10/2014 | Jefferies | G07C 5/0808 701/31.5 |
| 2015/0077223 | A1 | 3/2015 | Pipes | |
| 2015/0078137 | A1 | 3/2015 | Lee et al. | |
| 2015/0186840 | A1 | 7/2015 | Torres et al. | |
| 2015/0199859 | A1 | 7/2015 | Ouyang et al. | |
| 2015/0199863 | A1 | 7/2015 | Scoggins et al. | |
| 2015/0356801 | A1 | 12/2015 | Nitu et al. | |
| 2016/0063235 | A1 | 3/2016 | Tussy | |
| 2016/0155293 | A1 | 6/2016 | Reaves et al. | |
| 2016/0173595 | A1 | 6/2016 | Miller et al. | |
| 2017/0161978 | A1 | 6/2017 | Wishne | |
| 2017/0236352 | A1 | 8/2017 | Conrad et al. | |
| 2018/0115595 | A1 | 4/2018 | Krishnan et al. | |
| 2018/0216364 | A1 | 8/2018 | Wind et al. | |
| 2018/0230713 | A1 | 8/2018 | Sidhu et al. | |
| 2018/0253786 | A1 | 9/2018 | Frisby et al. | |
| 2018/0350170 | A1 | 12/2018 | Wang et al. | |
| 2019/0235644 | A1* | 8/2019 | Chen | G06F 3/011 |
| 2019/0259232 | A1 | 8/2019 | Nandakumar | |
| 2019/0351871 | A1* | 11/2019 | Kim | H04W 4/40 |
| 2019/0371101 | A1 | 12/2019 | Friedli | |
| 2020/0190854 | A1 | 6/2020 | Tropp | |
| 2020/0318389 | A1 | 10/2020 | Lou | |
| 2020/0378155 | A1 | 12/2020 | Zhang et al. | |
| 2022/0076514 | A1 | 3/2022 | Lingala et al. | |
| 2022/0101423 | A1* | 3/2022 | Minsley | E05B 39/04 |
| 2022/0343416 | A1* | 10/2022 | Minsley | E05B 67/00 |
| 2023/0096650 | A1* | 3/2023 | Minsley | G07C 9/00571 340/5.61 |
| 2024/0028688 | A1* | 1/2024 | Shen | G06F 21/36 |

OTHER PUBLICATIONS

Defendant's Answer to Second Amended Complaint and Counterclaim, *DaVinci Lock, LLC* v. *SpiderDoor, LLC*, Civil Action No. 2:23-cv-00343-NAD, U.S. District Court for the Northern District of Alabama, Jul. 19, 2023.

Plaintiffs' Reply in Support of Their Motion for Preliminary Injunction, *DaVinci Lock, LLC* v. *SpiderDoor, LLC*, Civil Action No. 2:23-cv-00343-CLM, U.S. District Court for the Northern District of Alabama, Aug. 1, 2023.

Defendant's Opposition to Amended Motion for Preliminary Injunction, *DaVinci Lock, LLC* v. *SpiderDoor, LLC*, Civil Action No. 2:23-cv-00343-NAD, U.S. District Court for the Northern District of Alabama, Jul. 14, 2023.

Order, *DaVinci Lock, LLC* v. *SpiderDoor, LLC*, Civil Action No. 2:23-cv-00343-CLM, U.S. District Court for the Northern District of Alabama, Jan. 4, 2024.

United States Patent and Trademark Office (USPTO), Non-final Office Action, U.S. Appl. No. 18/196,007, filed Aug. 11, 2023.

United States Patent and Trademark Office (USPTO), Final Office Action, U.S. Appl. No. 18/196,007, filed Oct. 13, 2023.

United States Patent and Trademark Office (USPTO), Non-Final Office Action, U.S. Appl. No. 18/196,007, filed Feb. 20, 2024.

United States Patent and Trademark Office (USPTO), Final Office Action, U.S. Appl. No. 18/196,007, filed Apr. 8, 2024.

Response to United States Patent and Trademark Office (USPTO), Non-final Office Action, U.S. Appl. No. 18/196,007, filed Sep. 28, 2023.

Response to United States Patent and Trademark Office (USPTO), Final Office Action, U.S. Appl. No. 18/196,007, filed Jan. 16, 2024.

Response to United States Patent and Trademark Office (USPTO), Non-final Office Action, U.S. Appl. No. 18/196,007, filed Mar. 14, 2024.

Response to United States Patent and Trademark Office (USPTO), Final Office Action, U.S. Appl. No. 18/196,007, filed Apr. 12, 2024.

United States Patent and Trademark Office (USPTO), Non-final Office Action, U.S. Appl. No. 17/994,596, filed Apr. 5, 2023.

United States Patent and Trademark Office (USPTO), Response to non-final Office Action, U.S. Appl. No. 17/994,596, filed Oct. 3, 2023.

United States Patent and Trademark Office (USPTO), Final Office Action, U.S. Appl. No. 17/994,596, filed Oct. 23, 2023.

* cited by examiner

DEVICE, SYSTEM AND METHOD FOR TRANSMITTING UNLOCK CODES VIA DISPLAY AUGMENTATION

TECHNICAL FIELD

The present disclosure relates generally to the field of physical locks and more particularly to a system, device and method for transmitting unlock codes for physical locks.

BACKGROUND AND SUMMARY

Access control problems exist in different commercial and personal environments such as self-storage facilities, warehouses, marinas, businesses, cargo shipping, home rentals, recreational activity locations, sports clubs and other locations. Different types of assets, whether physical or virtual, may be protected from general access through an access control feature such as a physical lock.

In some environments, over-locks are used as a form of secondary lock. For example, self-storage units are typically rented on a monthly basis. If a customer is delinquent and does not pay rent to the self-storage facility owner by an agreed-upon due date, the owner (i.e., landlord) has a right to prevent the customer from accessing the storage unit. Self-storage facility owners typically place an over-lock over the storage unit door, such as through a hasp that prevents opening of the door. The over-lock is utilized until the customer pays the delinquent past due balance on their account. A challenge in managing self-storage facilities is the requirement that a human attendant assist with placing and removing over-locks on units where there is a delinquent account.

Another challenge in managing self-storage facilities is securing vacant storage units when they are not being rented. If the vacant units are not properly secured, these units can be entered illegally and be used to store items for free by unauthorized persons, could be used to discard trash, and could be used for other illicit or illegal activities that could pose liability and safety issues for the self-storage facility and customers of the self-storage facility. Currently, vacant units must be secured using traditional physical locks. In the event a locked vacant unit is subsequently rented, a representative of the self-storage facility must manually visit the unit and remove the lock. Such a process is burdensome, manually intensive, and increases the time between a customer renting a unit, and actually being able to access the unit.

The process of placing and removing physical locks of any kind, including over-locks, can be quite burdensome, particularly at locations which may be rented to month-to-month customers. In instances where a lock is secured at a location based on a delinquent account, the lock must ultimately be removed once the customer account becomes non-delinquent. Removing locks is time-consuming and costly as it can require manual removal by personnel that may not be on site.

Similar challenges exist in other access control environments involving physical locks. In addition, the cost of conventional locks can be prohibitive. Many conventional locks including over-locks are electronic and provide automated and remote locking/unlocking functions. Such locks oftentimes require significant capital improvements at various types of locations. Furthermore, electronic locks inherently require constant power, and their continuous twenty-four hour per day operation increases power consumption costs at locations where installed. Furthermore, as with any complex electronic device, electronic locks are subject to failure and malfunction, and can require costly repairs to be conducted by an electrician, if not ultimately requiring replacement.

Other conventional physical locks include standard combination locks. However, with various facilities at different types of locations utilizing a limited number of standard combination locks, habitually delinquent customers eventually begin to recognize the unlock codes, and these locks become futile. The facility must then perpetually replace locks with unlock codes that have become known and compromised.

Another disadvantage of standard combination locks is the potential for delayed access to the customer. If the customer makes a payment and brings their account current when the facility management office is closed or when personnel are unavailable, such as on weekends, after-hours, or holidays, the customer must then wait until the office is open and there are personnel available to remove the lock. Thus, the customer cannot gain access to their asset(s) at the location. For example, in the case of a storage unit, the customer would not be able to gain access to their possessions immediately after making payment to bring their account current. The delay between such a payment and removal of the lock does not cater to tenants who may need immediate access to their asset(s). The same delays can be encountered when a customer forgets the unlock code for the lock, or would like to send another person to the facility to access the asset secured by the lock.

There is thus a need in a wide variety of access control environments for a system and method that allows or disallows access to a location such as a vacant storage unit, for example, without the need for an on-site attendant.

In various embodiments, the present disclosure provides a method for transmitting an unlock code for a physical lock based on a trigger event, including generating an augmented reality display for display on the mobile communications device containing the unlock code upon a camera of the mobile communications device capturing an image of lock related indicia associated with the physical lock.

In various embodiments, the present disclosure relates to a lock arrangement involving a physical lock and lock related indicia detectable by a camera of a mobile communications device, wherein upon detection of the lock related indicia, an augmented reality display is generated on a display of the mobile communications device, wherein the augmented reality display comprises an unlock code for the physical lock.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Figure 1:
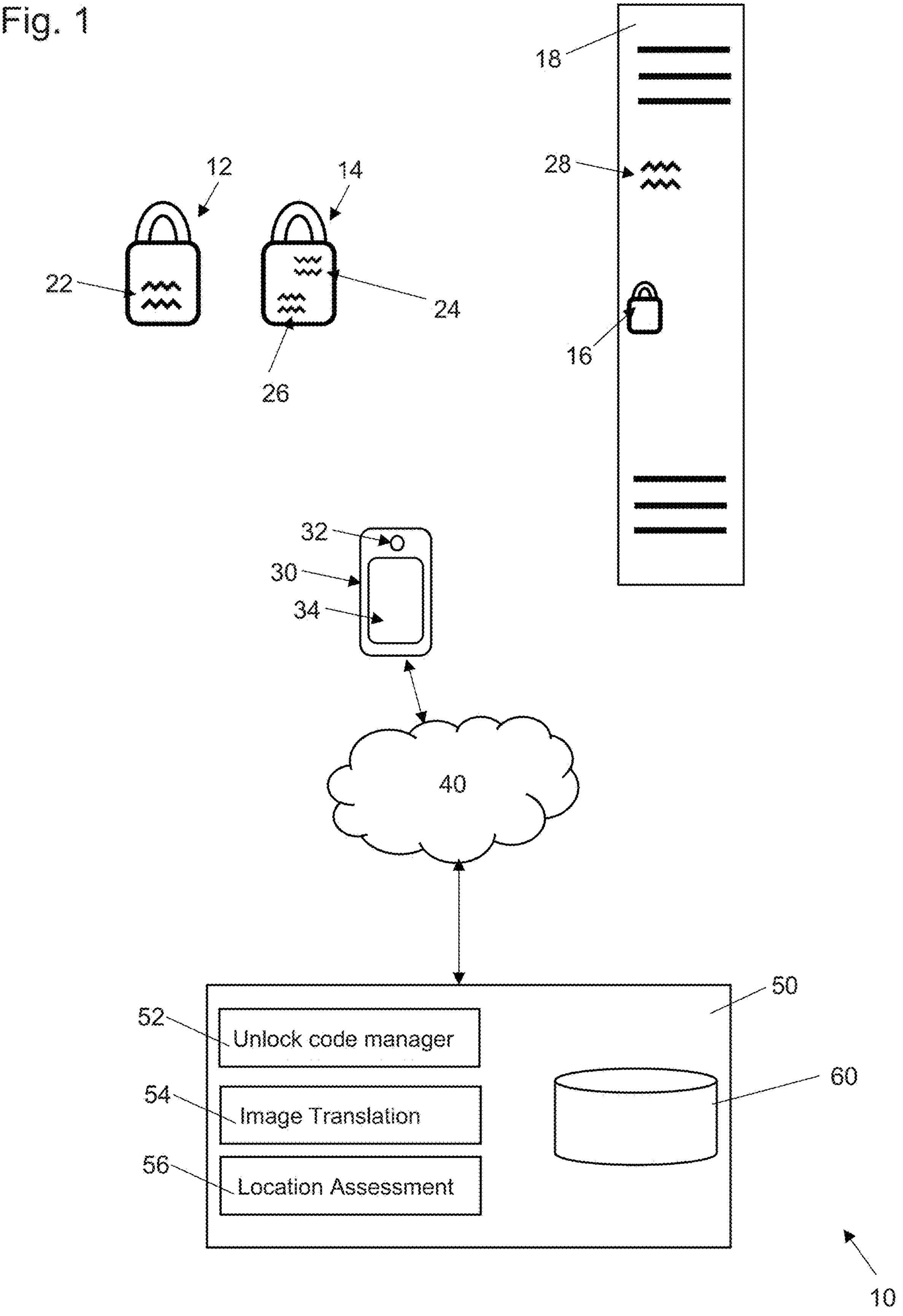
FIG. 1 is a schematic diagram of an embodiment of the present disclosure.

It should be understood that aspects of the present disclosure are described herein with reference to the drawings, which show illustrative embodiments. The illustrative embodiments herein are not necessarily intended to show all embodiments in accordance with the present disclosure, but rather are used to describe illustrative embodiments. Thus, aspects of the present disclosure are not intended to be construed narrowly in view of the illustrative embodiments. In addition, the present disclosure describes, among other things, a lock and event trigger system. Although the system is described with respect to its application in certain environments and locations, it is understood that the system could be implemented in any setting where access control may be useful.

Embodiments of the present disclosure provide an enhanced lock management system, for example, that permits a user to access certain desirable features using a mobile communications device, such as a tablet computer, smartphone, wearable device, personal digital assistant (PDA), laptop computer, "smart" watch, "smart" glasses, and any other device capable of being connected to a network (e.g., 40 in FIG. 1), receiving input and providing output such as on a display in accordance with the present disclosure. As an example, a physical lock can be provided to secure access to assets of some form. The physical lock can be provided with one or more lock related indicia affixed thereto or on a nearby device to enable a user with a properly enabled communications device to detect, scan or photograph the lock related indicia to reveal one or more augmented displays. For example, a user can scan lock related indicia on the physical lock or on a device in geographic proximity to the physical lock and image recognition software on the device can permit the user to access an image, a code, a video, a three-dimensional animation or other form of content that facilitates the user's ability to unlock the physical lock. The content can be, or can include, an unlock code for the physical lock. In various embodiments, the lock related indicia can take the form of an icon, a code element, a graphic pattern or image, a quick response (QR) code, or other indicia. In various embodiments, the lock related indicia can be the only item required to be recognized by the device prior to presenting the visual display of the device with the content. For example, in such embodiments, no additional code reading is required in order to present a responsive display on the device. In various embodiments, it is possible to provide an access credential validation process to users based on the capturing of the image of the lock related indicia on or near one or more locks, and then provide an additional display, which may be customized, based upon successful validation, wherein the additional display is or includes content in the form of an unlock code for the physical lock associated with the lock related indicia. In various embodiments, the access credential validation process can occur upon the device capturing an image of one lock related indicia, and upon successful validation, the unlock code display can occur upon the device capturing an image of a different lock related indicia. In various embodiments, the validation process is not required if the user has previously gained access and has not logged out and/or if the user has employed a single sign-on process as described elsewhere herein.

In various embodiments, a visual display is provided on the communications device display and represented in a way that it appears overlain upon an actual image of the physical lock or the lock related indicia seen through the camera of the device. Such an animation or other graphical display can be called, for example, "augmented reality". In various embodiments, the user's device is provided with a software application that automatically presents the content augmentation on the device screen when the device's camera captures lock enhanced indicia in accordance with the present disclosure. The content augmentation may or may not appear directly atop the image of the lock itself or of the lock related indicia itself, but may still be overlain on an image containing the lock and/or the lock related indicia.

It will be appreciated that lock related indicia can be affixed to devices and/or items beyond locks, such as units, walls, doors or other physical items in a facility incorporating one or more physical locks, for example. It will be appreciated that the term "affixed" or "affixation" as used in the present disclosure can include various approaches such as, but not limited to, placing a physical lock related indicia on a physical lock or device in proximity to the physical lock, wherein such placement can be through a sticker, hang tag, label or other such placement. The affixation can also be through printing, embossing, engraving or other more permanent form of affixation to a physical lock or a device in geographic proximity to a physical lock in accordance with embodiments of the present disclosure. It will be appreciated that any and all such lock related indicia can permit a user to receive responsive and/or augmented content via their communication device in accordance with the present disclosure.

In various aspects, a method of the present disclosure operates so as to receive lock related indicia via an interface for a software application operable by a mobile communications device, retrieve an unlock code for a physical lock associated with the lock related indicia and display the unlock code on the mobile communications device, such as by overlaying a captured image or other display of the lock and/or the lock related indicia with the unlock code. The unlock code can be an image display, a display of a word, character, number or some combination of one or more letters, symbols and/or numbers, a video display, an interactive video, a three-dimensional animation, an overlay on a real-time field of view image and/or other content that facilitates lock related activities as described herein, for example.

FIGS. 1 through 4 illustrate elements of the device, system and method of the present disclosure. As shown in FIG. 1, lock related indicia can be affixed to a physical lock or a device in proximity to a physical lock. For example, physical lock 12 is shown with lock related indicia 22 affixed thereto, physical lock 14 is shown with multiple lock related indicia 24, 26 affixed thereto and physical lock 16 is shown with a locker 18 and with lock related indicia 28 affixed to the locker 18. The lock related indicia 28 is associated with physical lock 16. It will be appreciated that the lock related indicia 28 is not secured on or to the physical lock 16 but rather in close geographic proximity to the physical lock 16, which may, for example, make such lock related indicia 28 more easily accessible to a user's communication device (e.g., 30 in FIG. 1).

A mobile communications device 30 is shown and includes sufficient processing and memory capabilities to support programming to support input/output devices such as a camera with lens 32, a display/graphical user interface 34, as well as programming to support image recognition, a lock software application such as provided in accordance with the present disclosure and other desirable functions. Detecting lock related indicia by the mobile communications device 30 can take many forms, including by scanning or photographing the lock related indicia, or by keeping the lock related indicia within a field of view of a camera element of the device, for example. It will be appreciated that the camera lens 32 can be provided so that it is facing outwardly from the same side of the device as the display (i.e., front facing lens) or facing outwardly from the opposite side of the device as the display (i.e., rear facing lens) or facing in both directions, for example.

The device 30 can detect one or more lock related indicia and, in various embodiments, transmit related information over a network 40 such as the Internet, for example, to a controlled access system (CAS) 50 associated with the present disclosure. The CAS 50 can include sub-components such as an unlock code manager 52, an image translation component 54, a location assessment component 56 and a database 60. The unlock code manager 52 can include software programming for associating physical locks with respective lock related indicia, mobile communications devices, mobile phone numbers, user identities and other lock management features, including authentication processes such as described herein. The image translation component 54 can include software programming for taking image information received from the mobile communications device 30 in order to inform the unlock code manager 52 regarding authentication requests and unlock code retrieval processes as described herein for facilitating transmission of unlock codes and/or other content to the mobile communications device 30. The location assessment component 56 can receive information associated with the lock related indicia or associated with the device 30 (such as its geo-coordinates, for example) in order to inform the unlock code manager 52 as to what content may be appropriate to provide back to the device 30. It will be appreciated that the mobile communications device 30 may incorporate software and/or hardware permitting its geolocation to be determined, and the CAS 50 may incorporate software or have access to a service provider available to perform functions including geolocation determination for the mobile communications device 30. Such geolocation information can be employed, for example, to verify that the mobile communications device is on-site where the physical lock and/or lock related indicia is located.

The network 40 may be any type of network suitable to allow interaction between devices, such as a mobile device 30 located at the access-controlled location and the CAS 50 and/or unlock code manager 52. For example, the network 40 may be a wired network, a wireless network, or any combination thereof. Further, the network 40 may include a distributed computing network, an intranet, a local-area network (LAN) and/or a wide-area network (WAN), or any combination thereof. For example, the LAN may make use of WIFI in its many variations and the WAN may make use of broadband, cellular and/or satellite networks using technologies including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies. However, those of ordinary skill in the art will appreciate that the network 40 is not limited thereto.

In various embodiments, the unlock code manager 52 determines if the user is authorized to view the unlock code prior to an unlock code being transmitted for viewing. It will be appreciated that the user can designate authorized parties beyond the user to request and receive the unlock code. For example, a user's family member, authorized agents, business associates, attorneys, and any other parties whom the customer wishes to have access to the access-controlled location can have their credentials associated with the access-controlled location. In such embodiments, the database record for the lock(s) at the access-controlled location includes a listing of all authorized parties and their respective credentials.

The database 60 can store data such as physical lock identifiers for each physical lock deployed along with associated lock related indicia, mobile communications devices, mobile phone numbers, user identities and other lock management features, including authentication processes such as described herein. The database 60 can further store content that can be sent to the device 30 based on determinations made by the unlock code manager 52. The stored content can be or include augmented reality programming, audio/video/image content and other content that can be sent by the CAS 50 to the device 30 such as may be displayed on the display 34 of the device 30 according to embodiments of the present disclosure. It will be appreciated that the CAS 50 and/or the unlock code manager 52 can be part of, or connected to, an access-controlled location or a management site via network 40. The management site can be remote from the access-controlled location and can serve multiple distributed access-controlled locations, such as in a central management site. In various embodiments, the management site can be located overseas, such as in a foreign call center.

In embodiments of the present disclosure, the device's camera can be provided so as to capture and/or generate still images and/or images in the form of motion video, any of which can be recorded and/or displayed on the device display 34. Further, in embodiments of the present disclosure, the images captured by the camera can be converted by an image sensor of the camera to an electronic signal, which represents electronic image data that can be processed as described herein. The electronic image data can be processed by image translation component 54 of CAS 50 or similar image processing software operable on the mobile communications device 30.

In obtaining the electronic image data, it will be appreciated that the camera of the device can be employed such that the camera captures an image through the lens, such as through the user selecting a camera application and capturing a picture or recording a video. Further, the camera application of the device 30 can be selected by the user and the manipulation of the device 30 such that the lock related indicia appears within the field of view of the lens 32 (without images being recorded by the user as in a photograph or recorded video) is sufficient to capture electronic image data for further processing as described herein.

Embodiments of the present disclosure can operate such that electronic image data from the camera can be used to display an augmented reality display on the device 30 using lock related indicia. As described above, the camera lens in operation with the camera can detect and capture an image including lock related indicia. This detection and capture can be from a snapshot or recorded video or can be by manipulating the device 30 such that the physical lock and/or the lock related indicia is/are within the camera's field of view. In various embodiments, the obtained image data is manipulated by software programming associated with the camera and stored on the device so as to convert the raw image data to electronic image data. The electronic image data is used to generate, on the display 34 of the communications device 30, an augmented reality display.

In various embodiments, more than one lock related indicia can appear on or proximate to a physical lock. For example, physical lock 14 is provided with multiple lock related indicia 24, 26. According to various embodiments, lock related indicia 24 can be associated with authentication procedures where a user and/or the mobile communications device 30 must first be authenticated prior to an unlock code being displayed. In such embodiments, a user may manipulate the communications device 30 so as to capture the lock related indicia 24 in the camera's field of view, triggering a communication to the CAS 50 to authenticate the user and/or the device 30. Such authentication can be a request to the mobile communications device 30 for a username and password or other authentication credentials, for example. If the user is not authorized, access is denied and a message can be displayed on the device informing the user that access has been denied. In connection with the various approaches described herein, it will be appreciated that the credentials may also be supplied via biometric means, such as with fingerprint, iris, voice, face, and gesture recognition means incorporated into the mobile device and/or software application. In various embodiments, authentication requirements of the mobile communications device such as passcode or facial recognition, for example, will suffice for authentication for purposes of receiving an unlock code and/or a display of the unlock code being rendered. In other words, once the user gains access to the mobile communications device, no further authentication is required. It will be appreciated that other forms of authentication can be provided, including, for example, permitting a user to be previously logged in by proper authentication credentials to facilitate automatic display of one or more unlock codes without requiring authentication credentials each time the customer wishes to receive an unlock code associated with the customer. Such authentication can occur via a persistent browser session and can be employed via session management where a user initially logs in to start a session and the session does not terminate without active sign off by the user or the expiration of some time limit, even if the user closes the operative browser. Such authentication can also occur via single sign-on (SSO) operations whereby a user may have previously logged in to a software application, social media account or other service requiring authentication, whereupon the user is permitted to automatically view a display of one or more unlock codes as described herein without requiring new or repeated entry of authentication credentials into a user interface. In various embodiments as will be appreciated to one of skill in the art, the system employs a session or cookies-based approach to these aspects of the present disclosure. In other embodiments as will be appreciated to one of skill in the art, the system employs JSON web tokens (JWT) for session management for these aspects of the present disclosure.

Upon confirming that the user and/or device 30 is authorized and further upon the device camera capturing the separate lock related indicia 26, a request is sent to the CAS 50 to process the captured image and return the unlock code associated with the lock related indicia 26. In various embodiments, rather than require the capturing of two separate lock related indicia 24, 26, the retrieval and display of the unlock code can be accomplished upon capturing one lock related indicia (e.g., 22 in FIG. 1) twice (once for authentication and once for unlock code display), or upon capturing one lock related indicia once, upon which authentication and unlock code display can be accomplished in sequence.

In various embodiments of the present disclosure, the captured image data can be processed locally by the mobile device 30 instead of by CAS 50, wherein an unlock code associated with a physical lock and lock related indicia is stored locally by the mobile device 30. Authentication details can further be stored locally by the mobile device 30. For example, the CAS 50 may push notifications and/or webhooks, for example, with a list of authenticated users to the mobile device 30 periodically, whereupon the mobile device 30 and/or software operable by the mobile device 30 then stores the list. As another example, software operable on the mobile device 30 can periodically query CAS (e.g., every five minutes) for an updated list of authenticated users and can then store the list locally on the device. Upon the mobile device camera capturing lock related indicia associated with a particular physical lock, software associated with the mobile device can retrieve an unlock code associated with the lock related indicia and display the unlock code on the device display 34, such as via an augmented reality display and subject to optional authentication procedure(s) as described elsewhere herein. Such arrangement can facilitate users obtaining unlock codes associated with physical locks when network connectivity is not available, for example.

Once the unlock code is displayed as described herein, the user can then unlock the physical lock and gain access to the desired access-controlled environment. In this way, a user need not memorize an unlock code but can use a readily available mobile communications device to obtain access to a locked environment or location to which the user has permission to access. Further, outside personnel is not required to be present or otherwise participate in assisting the user with gaining access to the location.

Figure 2:
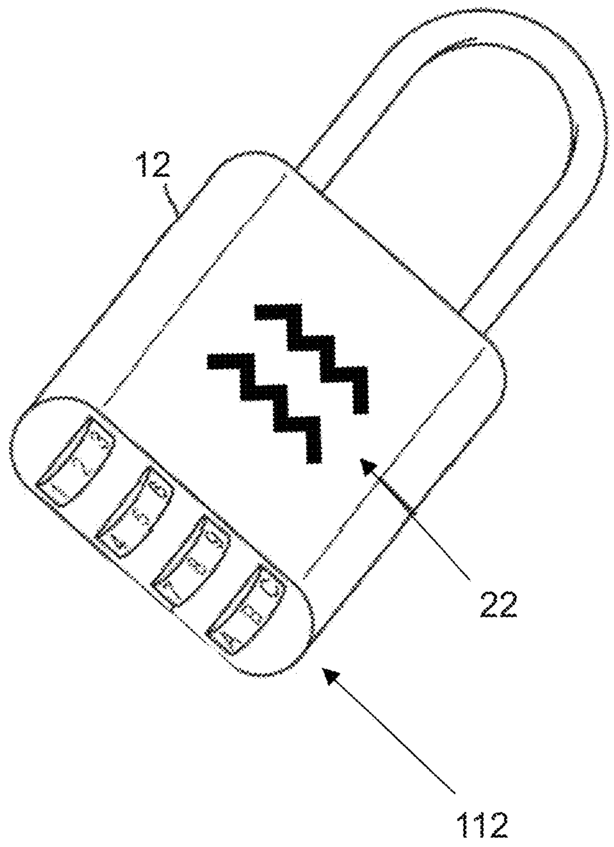
FIGS. 2 and 3 are embodiments of different physical locks in accordance with the present disclosure.
Figure 3:
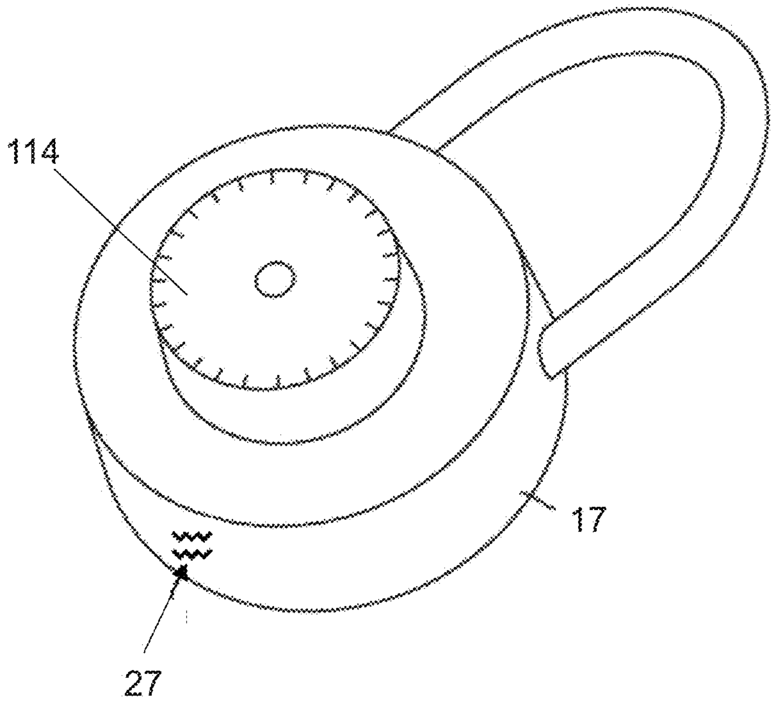

In various embodiments, a user's access to a location is restricted by a physical lock (e.g., 12, 17 as illustrated in FIGS. 1 through 3). In various embodiments, the lock can be a deadbolt, knob lock, or lever lock that includes a combination mechanism. The combination mechanism can include a tubular barrel, a rotary knob, pushpins, or a mechanical keypad, for example. As shown in FIG. 2, one form of a lock 12 is a combination padlock with a tubular barrel 112 requiring the unlock code to be dialed for each digit individually. As shown in FIG. 3, another specific form of a lock 17 can include a rotary knob 114 that requires an unlock code to be manually dialed in order to open the lock 17. In another embodiment, the lock can be an electronic lock that accepts a combination input via digital keys or a touchscreen. In various embodiments, the lock is a lock with no electronic circuitry or electronic components, and the lock is not capable of electronic communication, whether with a remote or a local system. Lock 12 in FIGS. 1 and 2 is shown with a lock related indicia 22 and lock 17 in FIG. 3 is shown with lock related indicia 27. The lock related indicia can be embodied in a variety of forms as described herein, including without limitation as a code, a QR code, a serial number, a barcode or other unique indicia. Unlock codes and lock related indicia for each lock can be generated at the time of manufacturing by the lock manufacturer and transmitted with the lock at the time of purchase by an access-controlled facility. In other embodiments, the access-controlled facility can generate unlock codes and lock related indicia for each received lock. In various embodiments, lock related indicia can include a near field communication (NFC) tag on or near the lock, wherein a mobile communications device can detect the NFC tag and, as a result, display an unlock code for the lock associated with the NFC tag. Such display can be an image of the unlock code overlain on an image of the lock or the NFC tag when the image of the lock or NFC tag is in a field of view of a camera of the mobile communications device, in accordance with display operations as disclosed elsewhere herein.

Upon certain circumstances occurring, such as where a user forgets the unlock code or where the user makes payment to bring a delinquent account balance current, for example, embodiments herein can facilitate the release of an unlock code for the lock.

Figure 4:
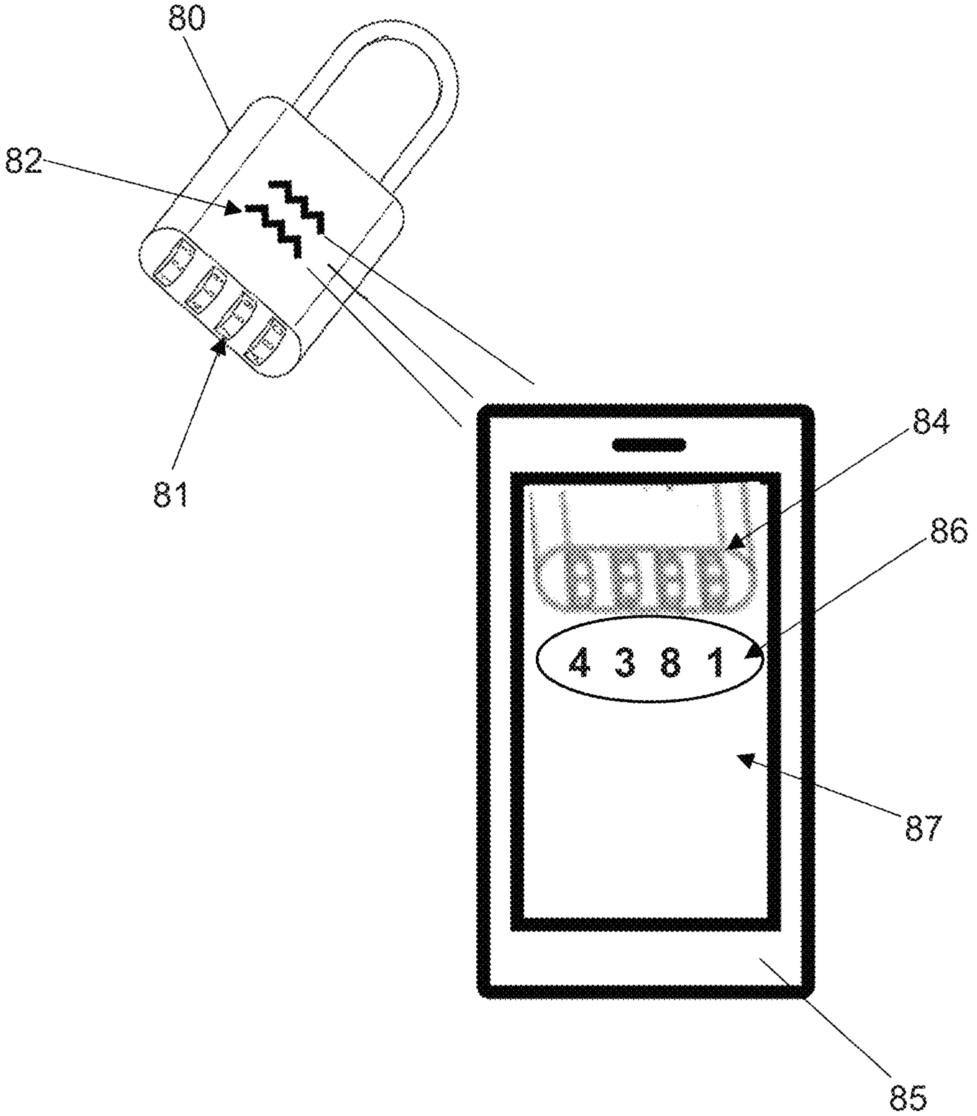
FIGS. 4 and 5 are diagrams illustrating exemplary mobile communications device displays in accordance with embodiments of the present disclosure.
Figure 5:
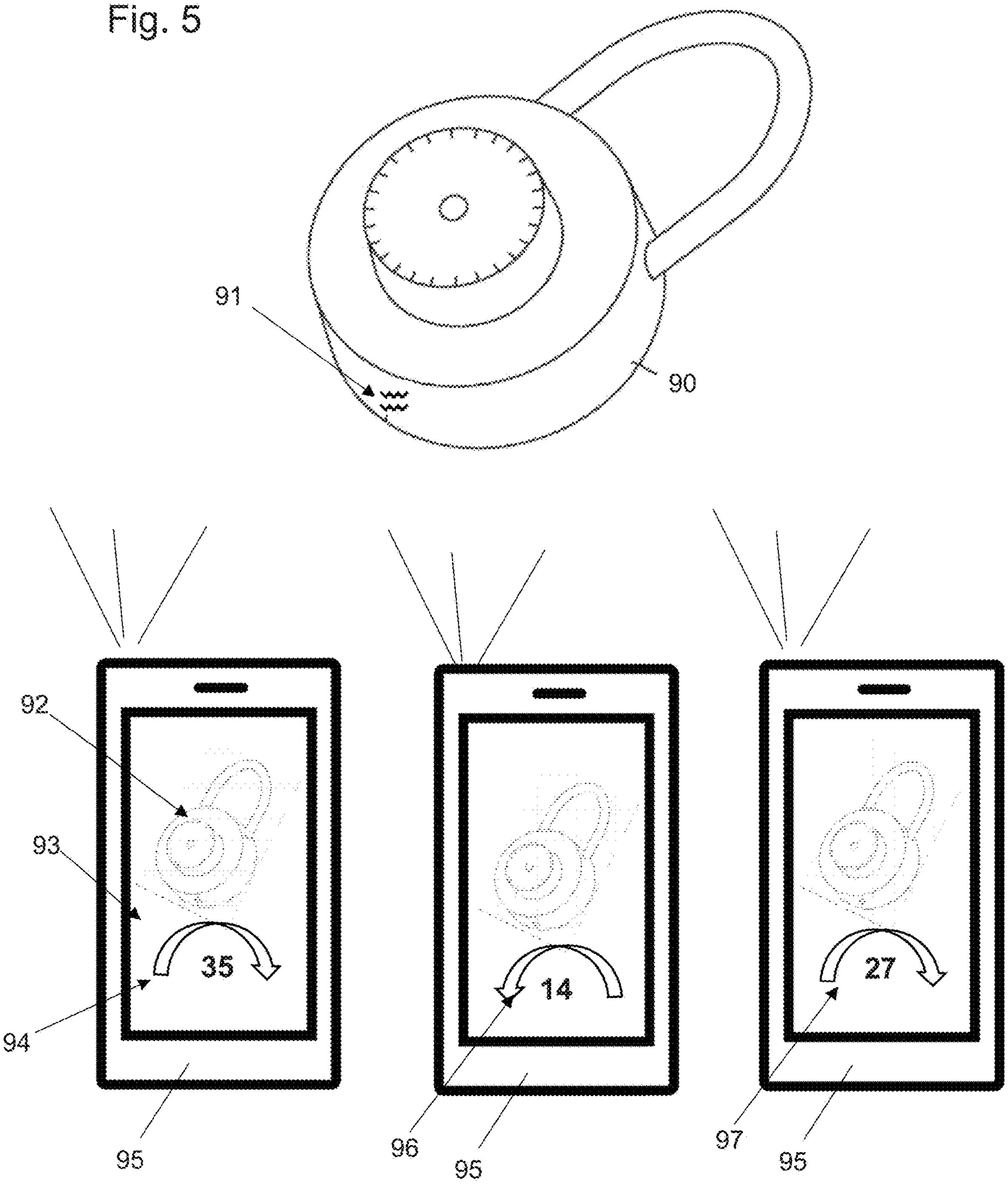

FIGS. 4 and 5 illustrates examples of unlock codes displayed over an image displayed and/or captured by a mobile device camera. As shown in FIG. 4, a combination lock 80 with tubular barrel 81 and lock related indicia 82 are shown. Upon authentication as necessary in accordance with the present disclosure, and upon capturing an image 84 of the lock 80 via a camera of the mobile device 85, content in the form of the unlock code 86 for the lock 80 is provided and displayed on the display 87 of the mobile device 85. In FIG. 4, the unlock code 86 is displayed over the captured image and underneath the respective digits of the tubular barrel 81 to facilitate ease of application by the user. In various embodiments, the unlock code can be displayed over (i.e., overlain on) the image containing the lock and/or the lock related indicia, regardless of whether the unlock code is displayed directly over the portion of the image containing the lock and/or the lock related indicia.

As shown in FIG. 5, a rotary knob lock 90 is shown with lock related indicia 91. Upon capturing an image 92 of the lock 90 via a camera of the mobile device 95, content in the form of the unlock code for the lock 90 is provided in a series of images and/or a video animation and displayed on the display 93 of the mobile device 85. For example, image 94 shows a clockwise rotation arrow with the combination element "35". Image 96 shows a counterclockwise rotation arrow with the combination element "14" and image 97 shows a clockwise rotation arrow with the combination element "27". It will be appreciated that the display can be supplemented beyond that shown in FIG. 5, including, for example, the number of clockwise or counterclockwise rotations required to implement the unlock code successfully.

Figure 6:
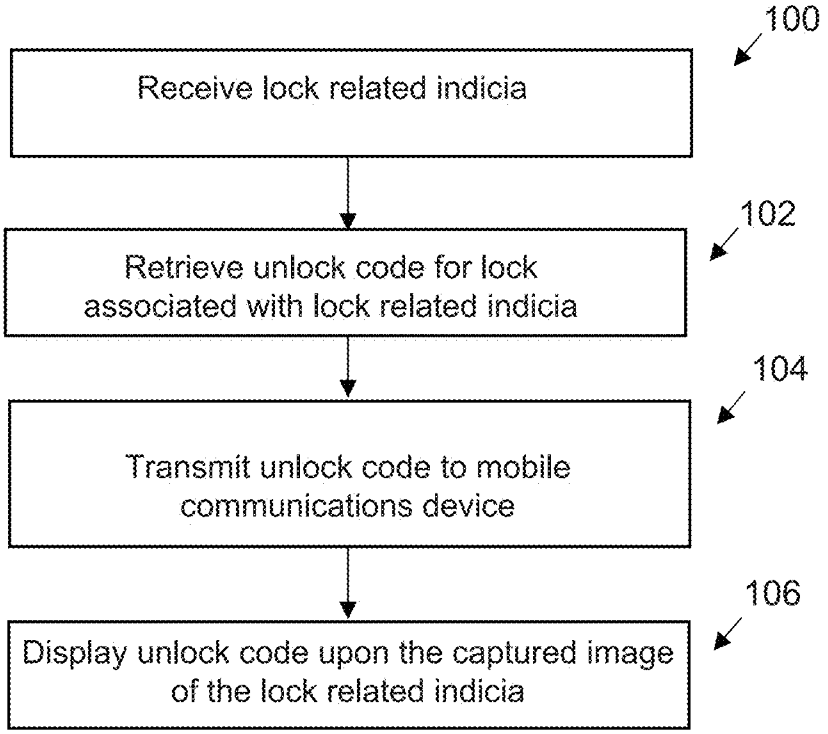
FIGS. 6 and 7 are flow diagrams illustrating aspects of the present disclosure.
Figure 7:
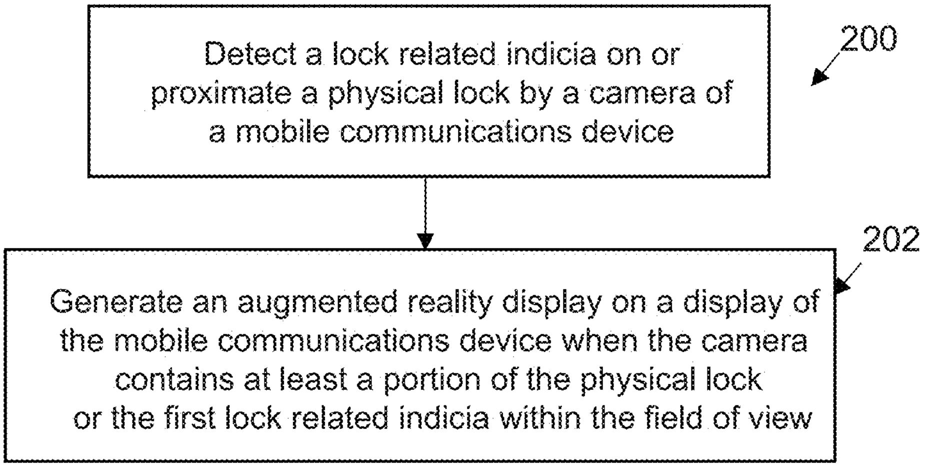

FIGS. 6 and 7 are diagrams illustrating exemplary processes in accordance with the present disclosure. As at 100 in FIG. 6, lock related indicia is received via an interface such as display 34 for a software application operable by a mobile communications device. As described elsewhere herein, the interface can be or include a captured image of the lock related indicia and the captured image is captured from a camera of the mobile communications device. As at 102, an unlock code is retrieved for a physical lock associated with the lock related indicia. As at 104, the unlock code is transmitted to the mobile communications device, and as at 106, the unlock code is overlain upon the captured image of the lock related indicia on the interface for the software application operable by the mobile communications device.

As described elsewhere herein, it will be appreciated that the captured image of the lock related indicia can be or include an image of the lock related indicia on the physical lock. In other embodiments, the captured image of the lock related indicia can be or include an image of the lock related indicia from a device in geographic proximity to the physical lock, as shown with the locker 18 and lock related indicia 28 of FIG. 1. Further, as described elsewhere herein, prior to retrieving the unlock code, a determination can be made that the lock related indicia is associated with the mobile communications device or a user of the mobile communications device such as through an authentication process.

As at 200 in FIG. 7, a lock related indicia on or proximate a physical lock is detected by a camera of a mobile communications device, wherein the camera has a field of view. As at 202, an augmented reality display is generated on a display of the mobile communications device when the camera contains at least a portion of the physical lock or the first lock related indicia within the field of view. The augmented reality display can be or include an unlock code for the physical lock.

As described elsewhere herein, in various embodiments, a second lock related indicia can be detected on or proximate the lock prior to detecting the first lock related indicia on the physical lock, and a determination can be made prior to generating the augmented reality display, that the second lock related indicia is associated with the mobile communications device or a user of the mobile communications device. In this way, the user and/or the device can be authenticated as being associated with the lock related indicia prior to the unlock code being revealed.

In various embodiments, the unlock code can be a temporary unlock code which expires after a pre-determined period of time, or a one-time-use unlock code. In various embodiments, the unlock code can be a first unlock code at a first time and a second unlock code at a second time different from the first time. In such embodiments, the first unlock code is different from the second unlock code. This arrangement can permit locks to be re-used by the same or different users and can further provide added security in the event an unscrupulous individual somehow obtains the first unlock code. It will be appreciated that the first time described above is a first time duration and the second time described above is a second time duration. The durations can be the time periods in which different owners have access to the unlock code for the lock. In various embodiments, the first time duration is equal to the second time duration.

Among other embodiments, a lock arrangement in accordance with the present disclosure is disclosed in the form of a physical lock and a lock related indicia detectable by a camera of a mobile communications device, wherein upon detection of the lock related indicia, an augmented reality display is generated on a display of the mobile communications device, wherein the augmented reality display comprises an unlock code for the physical lock. Such arrangement can further incorporate a second lock related indicia detectable by the camera of the mobile communications device, wherein upon detection of the second lock related indicia and prior to generating the augmented reality display, the second lock related indicia is determined to be associated with the mobile communications device or a user of the mobile communications device. In various embodiments, the physical lock includes, displays and/or incorporates at least one of the first and second lock related indicia. In various embodiments, at least one of the first and second lock related indicia is affixed to the physical lock. In various other embodiments, at least one of the first and second lock related indicia is not affixed to the physical lock.

It will be appreciated that the device 30 can take other forms, including a wearable computing device, a portable computer such as a laptop or notebook computer, or other device, and can have input receiving capabilities, such as a microphone, camera, keyboard, gesture recognition software, touchscreen display and other inputs. The device can further have output capabilities, including speakers and display 34.

It will be appreciated that the system of the present disclosure can be implemented in the device 30 itself, or as implemented as controlled access system (CAS) 50, or as implemented as a combination or sub-combination of the device 30 and CAS 50, or as implemented as a combination or sub-combination including unlock code manager 52, and can incorporate necessary processing power and memory for storing data and programming that can be employed by the processor(s) to carry out the functions and communications necessary to facilitate the processes and functionalities described herein. Appropriate encryption and other security methodologies can also be employed by the system, device and method of the present disclosure, as will be understood to one of ordinary skill in the art.

It will be appreciated that embodiments of the present disclosure can be implemented in any setting where access control as secured by a lock may be useful, such as hotel rooms, apartment buildings, storage containers, self-storage facilities, short-term housing rentals, and lockers. In addition, the present disclosure can be implemented within a controlled access system such as equipment rooms, vaults, hospitals, airports, government facilities, nuclear power facilities, water treatment facilities, weapon storage facilities, aircraft cockpits, and any other setting that requires restricted, selective, or monitored access.

In certain embodiments in which the system includes a computing device, such as a mobile communications device, a CAS server, an unlock code manager, etc., the computing device is any suitable computing device (such as a server) that includes at least one processor and at least one memory device or data storage device. As further described herein, the computing device includes at least one processor configured to transmit and receive data or signals representing events, messages, commands, or any other suitable information between the computing device and other devices. The processor of the computing device is configured to execute the events, messages, or commands represented by such data or signals in conjunction with the operation of the computing device.

It will be appreciated that any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing, including a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

It will be appreciated that all of the disclosed methods and procedures herein can be implemented using one or more computer programs or components. These components may be provided as a series of computer instructions on any conventional computer-readable medium, including RAM, SATA DOM, or other storage media. The instructions may be configured to be executed by one or more processors which, when executing the series of computer instructions, performs or facilitates the performance of all or part of the disclosed methods and procedures.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers and computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on a user's computer, as a stand-alone software package, partly on a user's computer and partly on a remote computer or entirely on the remote computer or server.

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

Although the present approach has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present approach.

The invention claimed is:

1. A computer-implemented method for retrieving an unlock code for a physical lock, comprising:

receiving, by a computing device, lock related indicia via an interface for a software application operable by a mobile communications device, wherein the interface comprises a captured image of the lock related indicia;

retrieving, by the computing device, an unlock code for a physical lock associated with the lock related indicia, wherein the physical lock is not capable of electronic communication; and transmitting the unlock code by the computing device to the mobile communications device, whereupon the unlock code is overlain upon the captured image of the lock related indicia on the interface for the software application operable by the mobile communications device.

2. The computer-implemented method of claim 1, wherein the captured image is captured from a camera of the mobile communications device.

3. The computer-implemented method of claim 1, wherein the captured image of the lock related indicia comprises an image of the lock related indicia on the physical lock.

4. The computer-implemented method of claim 1, wherein the captured image of the lock related indicia comprises an image of the lock related indicia from a device in geographic proximity to the physical lock.

5. The computer-implemented method of claim 1, wherein prior to retrieving the unlock code, the method comprises:

determining that the lock related indicia is associated with the mobile communications device or a user of the mobile communications device.

6. A method for displaying an augmented reality display using lock related indicia, comprising:

detecting, via a camera of a mobile communications device, a first lock related indicia on a physical lock, wherein the camera has a field of view; and generating, on a display of the mobile communications device, an augmented reality display when the camera contains at least a portion of the physical lock within the field of view, and wherein the augmented reality display comprises an unlock code for the physical lock.

7. The method of claim 6, further comprising:

detecting, via the camera of the mobile communications device, a second lock related indicia on or proximate the lock prior to detecting the first lock related indicia on the physical lock; and determining, prior to generating the augmented reality display, that the second lock related indicia is associated with the mobile communications device or a user of the mobile communications device.

8. The method of claim 6, wherein the unlock code comprises a first unlock code at a first time, and further comprises a second unlock code at a second time different from the first time, wherein the first unlock code is different from the second unlock code.

9. The method of claim 8, wherein the first time comprises a first time duration and wherein the second time comprises a second time duration.

10. The method of claim 9, wherein the first time duration is equal to the second time duration.

11. A lock arrangement, comprising:

a physical lock; and a first lock related indicia detectable by a camera of a mobile communications device, wherein upon detection of the first lock related indicia, an augmented reality display is generated on a display of the mobile communications device, wherein the augmented reality display comprises an unlock code for the physical lock overlain upon an image of the physical lock or the first lock related indicia.

12. The lock arrangement of claim 11, further comprising a second lock related indicia detectable by the camera of the mobile communications device, wherein upon detection of the second lock related indicia and prior to generating the augmented reality display, the second lock related indicia is determined to be associated with the mobile communications device or a user of the mobile communications device.

13. The lock arrangement of claim 12, wherein the physical lock comprises at least one of the first and second lock related indicia.

14. The lock arrangement of claim 13, wherein at least one of the first and second lock related indicia is affixed to the physical lock.

15. The lock arrangement of claim 12, wherein at least one of the first and second lock related indicia is not affixed to the physical lock.

16. The lock arrangement of claim 12, wherein at least one of the first and second lock related indicia is affixed to a device in geographic proximity to the physical lock.

17. The lock arrangement of claim 11, wherein the unlock code comprises a first unlock code at a first time, and further comprises a second unlock code at a second time different from the first time, wherein the first unlock code is different from the second unlock code.

18. The lock arrangement of claim 17, wherein the first time comprises a first time duration and wherein the second time comprises a second time duration.

19. The lock arrangement of claim 18, wherein the first time duration is equal to the second time duration.

20. A method for displaying an augmented reality display using lock related indicia, comprising:

detecting, via a mobile communications device, a first lock related indicia on or proximate a physical lock, wherein the first lock related indicia comprises an NFC tag; and generating, on a display of the mobile communications device, an augmented reality display when a camera of the mobile communications device contains at least a portion of the physical lock or the first lock related indicia within a field of view, and wherein the augmented reality display comprises an unlock code for the physical lock overlain upon an image of the physical lock or the first lock related indicia.

* * * * *